United States Patent
Kabutz et al.

(10) Patent No.: US 6,396,782 B1
(45) Date of Patent: May 28, 2002

(54) APPARATUS FOR READING OR WRITING DATA MARKINGS OF AN OPTICAL RECORDING MEDIUM HAVING OFFSET HEADER MARKINGS

(75) Inventors: Marten Kabutz; Bruno Peytavin, both of Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/460,066

(22) Filed: Dec. 14, 1999

(30) Foreign Application Priority Data

Dec. 15, 1998 (DE) .......................................... 198 57 605

(51) Int. Cl.⁷ ................................................ G11B 5/09
(52) U.S. Cl. ................................ 369/47.27; 369/47.17; 369/124.07; 369/124.12
(58) Field of Search ........................... 369/44.26, 44.29, 369/44.35, 124.07, 124.08, 124.12, 124.15, 53.31, 47.21, 47.22, 47.23, 47.27, 275.3, 275.4, 47.17, 47.18

(56) References Cited

U.S. PATENT DOCUMENTS

| | | | |
|---|---|---|---|
| 5,754,506 A | | 5/1998 | Nagasawa et al. ........ 369/44.26 |
| 6,021,101 A | * | 2/2000 | Satoh ........................ 369/275.1 |
| 6,044,051 A | * | 3/2000 | Miyagawa et al. ....... 369/47.19 |
| 6,118,752 A | * | 9/2000 | Miyagawa et al. ....... 369/275.3 |
| 6,141,308 A | * | 10/2000 | Kim ....................... 369/124.15 |
| 6,205,096 B1 | * | 3/2001 | Yeo et al. ............... 369/124.15 |
| 6,275,466 B1 | * | 8/2001 | Nagasawa et al. ....... 369/275.3 |

FOREIGN PATENT DOCUMENTS

| | | |
|---|---|---|
| EP | 0757343 A1 | 2/1997 |
| EP | 0801382 A2 | 10/1997 |

OTHER PUBLICATIONS

German Search Report citing the above–listed references: AA, AM, and AN.

* cited by examiner

Primary Examiner—Thang V. Tran
(74) Attorney, Agent, or Firm—Joseph S. Tripoli; Joseph J. Laks; Frederick A. Wein (57) ABSTRACT

The present invention relates to an apparatus for reading and/or writing data markings of an optical recording medium having data markings arranged along a track and header markings arranged laterally offset with respect to the center of this track. The apparatus has a signal conditioner, a header identification unit and a switch unit driven by the latter. The object of the invention is to enable data and header markings to be read out with the lowest possible error rate. For this purpose, the apparatus according to the invention has a threshold value forming unit and a storage unit with at least two storage locations, in which case, by means of the switching unit, the input of the storage unit can be connected to the output of the threshold value forming unit and the output of the said storage unit can be connected to a threshold value input of the signal conditioner. The apparatus according to the invention is suitable for reading from or writing to optical recording media such as a DVD-RAM, for example.

13 Claims, 5 Drawing Sheets

APPARATUS FOR READING OR WRITING DATA MARKINGS OF AN OPTICAL RECORDING MEDIUM HAVING OFFSET HEADER MARKINGS

FIELD OF THE INVENTION

The present invention relates to an apparatus for reading and/or writing data markings of an optical recording medium having data markings arranged along a track and header markings arranged laterally offset with respect to the centre of this track.

BACKGROUND OF THE INVENTION

An apparatus of this type is disclosed in EP-A2-0 801 382. In this case, an optical recording medium is read which has data markings arranged along a circular or spiral track and also header markings arranged at specific intervals in the track direction. The header markings are in this case arranged laterally offset with respect to the track, in particular offset by half a track width. The known apparatus may be regarded as having the disadvantage that the read-out unit for reading out the data markings is optimized for the detection of markings which are arranged centred with respect to the track. Therefore, reading errors occur during the read-out of the header markings, which are laterally offset, that is to say arranged off-centre. In the case of the known apparatus, a reduction of the reading errors is obtained by virtue of the fact that, in order to read out the header markings, a difference signal formed from photodetector signals is used instead of the summation signal that is customary for the read-out of the data markings. This solution may be regarded as having the disadvantage that the evaluation unit is also not optimally adapted to this difference signal. A second signal processing path is prescribed as an alternative. This has the disadvantage of increasing the outlay on circuitry.

SUMMARY OF THE INVENTION

The object of the present invention is to enable data and header markings to be read out with the smallest possible error rate.

This object is achieved by means of the features specified in claim 1. In this case, the apparatus has a signal conditioner for forming a conditioned signal from an electrical signal generated by a photodetector, a header identification unit for identifying whether data or header markings are being read, and a switch unit, which is driven by the header identification unit and serves for connecting an input of the signal conditioner to different input signal sources. According to the invention, the apparatus furthermore has a threshold value forming unit for forming an input signal for the signal conditioner and a storage unit with at least two storage locations. By means of the switch unit, the input of the storage unit can be connected to the output of the threshold value forming unit and the output of the storage unit can be connected to a threshold value input of the signal conditioner. This has the advantage that reading errors are reduced by virtue of optimum adaptation of the signal conditioner to the signal, which is dominated either by header markings or by data markings. A different threshold value is fed as input signal to the signal conditioner for the purpose of reading out header markings from that which is fed for the purpose of reading out data markings. A further advantage is that in the event of a change from header to data markings, as a result of the changeover of the switch unit, a stored threshold value, that is to say one that is well adapted to the type of markings that is presently to be read out, immediately passes to the threshold value input of the signal conditioner. This threshold value is then subsequently additionally optimized by the threshold value forming unit.

A development of the invention provides for the switch unit to have three switch positions. This has the advantage that different threshold values are possible for data markings, header markings offset to the left and header markings offset to the right. In this case, it is necessary to provide a correspondingly larger number of storage locations.

According to the invention, the threshold value forming unit and the storage unit are realized on a digital basis. This has the advantage that interfering influences caused by fluctuations in the component properties which are unavoidable in the case of analogue components do not occur. In contrast to an analogue store realized by means of capacitors, storage that is virtually unlimited in terms of time, without any change to the stored value, is possible.

According to the invention, in each case two storage locations are provided for each switch position. This has the advantage that the series-connected storage locations have stored both the present and the preceding value of the threshold value, the preceding value in each case being utilized as input signal for the signal conditioner. In the event of an error occurring, the preceding, but correct value is no longer overwritten by the present, but already incorrect value, rather the correct value is utilized as input signal for the signal conditioner until the error no longer occurs.

A development of the invention provides for a switch to be present for connecting the threshold value input of the signal conditioner to the output of the switch unit or to the output of the threshold value forming unit. This has the advantage that in the normal case, that is to say when no error occurs, and when no transition from header to data markings or the like occurs, the present threshold value is always supplied to the signal conditioner. Given the presence of interference or in the event of a transition from header to data markings, on the other hand, a changeover is made to the stored, preceding threshold value, which is better adapted in this case.

The invention's method for the error-free read-out of data and header markings of a corresponding recording medium provides for a threshold value to be formed by means of which a conditioned signal is formed from a detector signal. The present threshold value is stored in a first store during the reading of a data area, while the present threshold value is stored in a second store during the reading of a header area. Given the presence of a transition, for example from data area to header area or vice versa or within different types of data and/or header areas, on the other hand, storage is prevented and the stored threshold value corresponding to the type of area to be newly read is used for the purpose of forming the conditioned signal. In the event of a transition from one area to another, the type to which the following area to be newly read corresponds is generally known or can be ascertained. The method according to the invention has the advantage that after a transition from data area to header area, a poorly adapted, that is to say incorrect threshold value which settles only relatively slowly to the correct order of magnitude is not worked with, rather a threshold value that is adapted to the type of area to be read next is begun with immediately. This increases the scanning reliability and reduces the error rate.

A development of the method provides for the prevention of new storage and the use of the value already stored to be maintained for a predetermined period of time after the identification of a transition. This has the advantage that the value which is highly suitable for the type of area to be newly read is compulsorily retained directly after the transition. The system settles during this time, with the result that the system is stable at the end of this period of time and the newly formed threshold value has reached the correct value. The method is adapted to the properties of the apparatus by prescription of the period of time. A longer or shorter period of time may be expedient depending on these properties. The period of time should generally be as short as possible in order to obtain regulated adaptation of the threshold value relatively rapidly, but on the other hand should be long enough to prevent any errors that may occur in the transient recovery phase from taking effect. Also within the scope of the invention is that said time ends when the newly formed threshold value reaches a stable value or a value within a certain range around the stored value.

The invention provides for the prevention of new storage and the use of the value already stored also to be effected when a defect occurs. This has the advantage that the restart of the read-out after the defect is begun with a good threshold value, the stored threshold value, which is not corrupted on account of the defect. An example of what may be regarded as a defect in this case is an influence on the signal which is caused by scratches, dirt or the like and renders the read-out impossible for a short time, or at the very least results in a high error rate. Even in the case where an error is present, it is also generally possible to establish the type of area to be read after the error. This can be detected accurately in the case of slight errors; in the case of more serious errors, it is assumed as an approximation that the type of area valid last is also present after the end of the error. It is also possible to predict the type of area from known features of the disk, e.g. distance between succeeding header areas, and actual values, e.g. time elapsed after last header area, actual scanning speed etc.

According to the invention, in the event of a plurality of different types of header areas or data areas being present, further stores are utilized for storing and reading out the threshold values for the corresponding types of header areas or data areas. This has the advantage that the method can also be adapted to optical recording media which have headers offset both to the left and to the right of the track. It can thus also be adapted to other types of data areas or header areas provided with other different properties.

The invention furthermore provides for each store to have at least two storage locations, in which case storage is effected in a first storage location and reading is effected from a second storage location. In this case, the content of the first storage location is transferred to the second storage location in a time delayed or deferred manner, referred to as manner staggered over time, for example during the next or a following clock cycle. In order to interrupt the storage, the transfer from the first to the second storage location is prevented, with the result that the value of the second storage location is not updated, that is to say is retained. This has the advantage that it is not necessary to rapidly identify the transition or to rapidly identify errors. An already incorrect value stored in the first storage location does not yet influence the signal conditioner, which operates using the value situated in the second storage location, this value still being correct. Only the transfer from the first to the second storage location has to be interrupted. The time thereby gained generally suffices for reliably identifying a transition or a defect, even in the case of very high clock rates.

Advantageous refinements of the invention are also specified in the following description of exemplary embodiments. However, the invention is not restricted to these exemplary embodiments. In the figures,

DETAILED DESCRIPTION OF PREFERRED EMBODIMENTS

Figure 1:
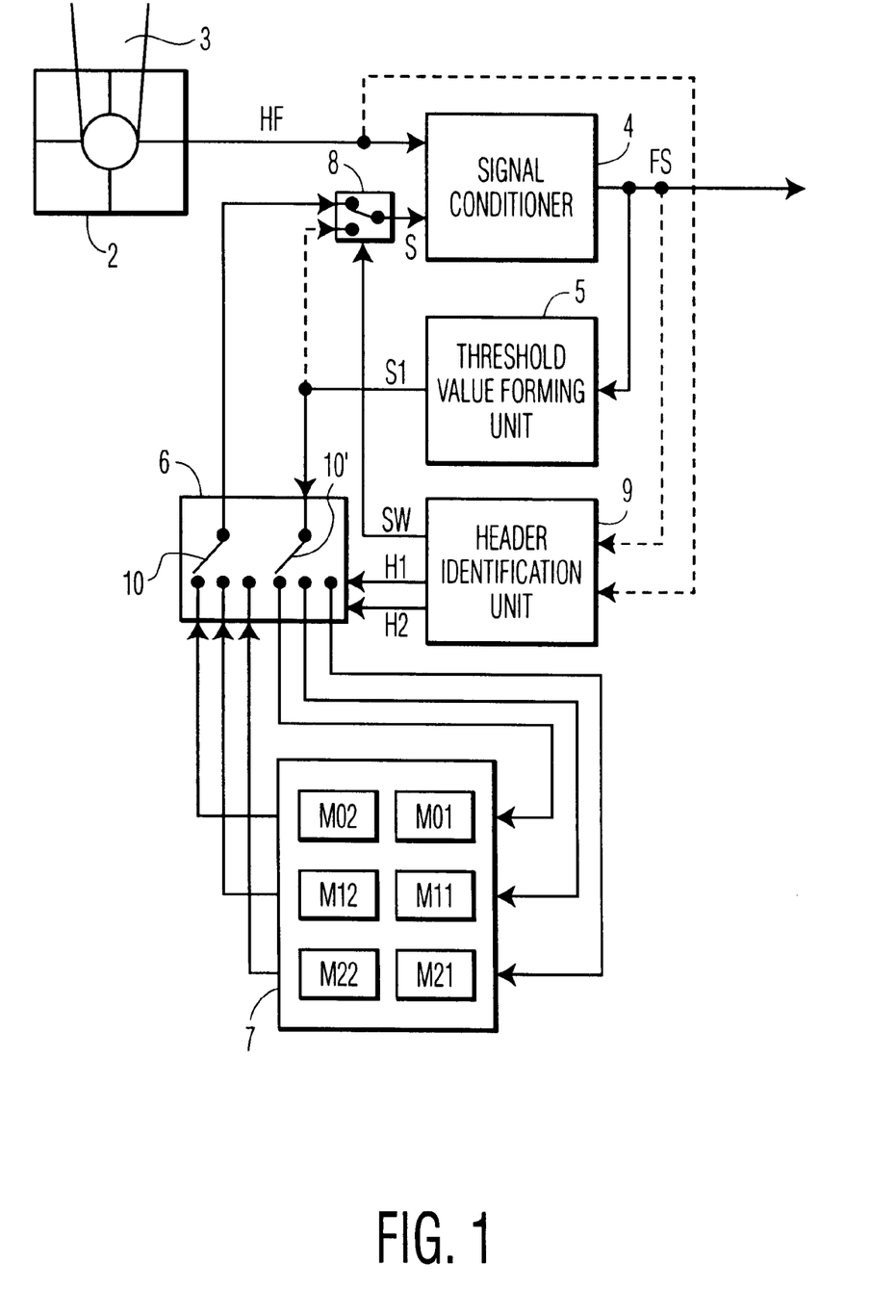
FIG. 1 shows a schematic illustration of an apparatus according to the invention.

FIG. 1 shows part of an apparatus according to the invention in a schematic illustration. A light beam 3, which comes from a recording medium (not illustrated here), falls onto a detector 2. The detector 2 is illustrated as a four-quadrant detector, but other forms customary to a person skilled in the art may also likewise be used in this case. A high-frequency signal HF generated from the signals output by the individual quadrants of the detector 2 is fed to a signal conditioner 4, which forwards a conditioned signal FS to an evaluation unit (likewise not illustrated) for further evaluation. A threshold value forming unit 5 forms a threshold value S1 from the conditioned signal FS, which threshold value is fed either via a switch unit 6 and a storage unit 7 or directly as threshold value S to a threshold value input of the signal conditioner 4. A changeover switch 8 connects the threshold value input of the signal conditioner 4 either to the output of the switch unit 6 or to the output of the threshold value forming unit 5. For this purpose, the changeover switch 8 is driven by a header identification unit 9. One variant of the invention provides for the changeover switch 8 to be dispensed with and for the threshold value input of the signal conditioner 4 always to be connected to the output of the switch unit 6.

Figure 5:
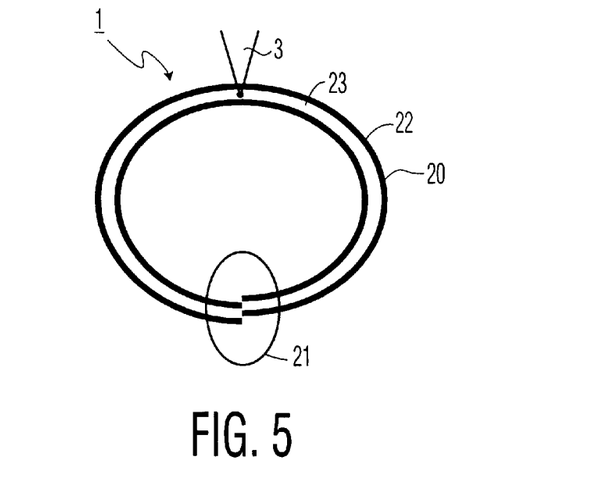
FIG. 5 shows a schematic illustration of an optical recording medium provided with data and header markings.
Figure 6:
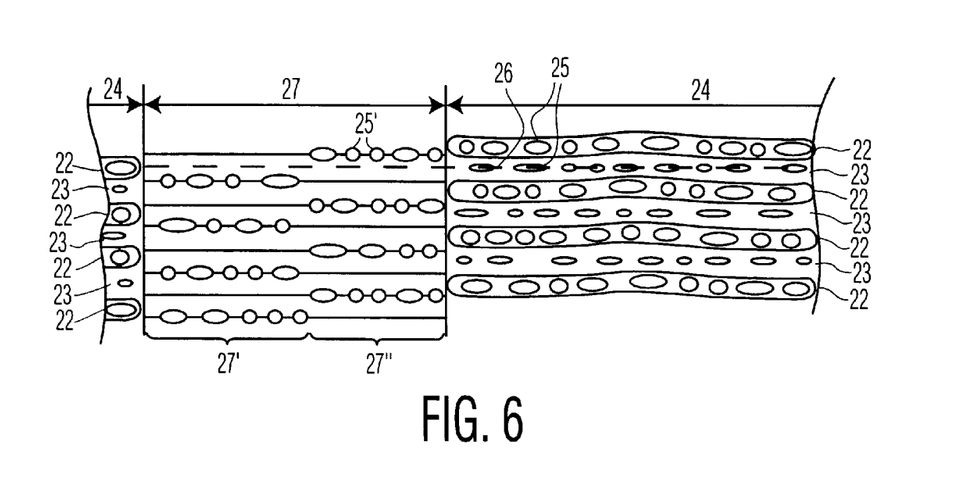
FIG. 6 shows a schematic illustration of a header area of the optical recording medium in accordance with FIG. 5.

The header identification unit 9 evaluates the high-frequency signal HF or the conditioned signal FS. Both variants are illustrated in FIG. 1. A combined evaluation of both signals HF and FS also lies within the scope of the invention. The header identification unit 9 evaluates the high-frequency signal HF and/or the conditioned signal FS to see whether a data area or a header area of the recording medium is being read. If appropriate, different types of header or data areas are also detected as well. The header and data areas are represented in FIGS. 5 and 6 and described in more detail with reference to these figures. The header identification unit 9 outputs a signal H1 if a first header area is being read and a signal H2 if a second header area is being read. The signals H1 and H2 are not present, that is to say they are at low level for example, if a data area is being read. In the variant of the invention which has the changeover switch 8, the header identification unit 9 outputs a changeover signal SW to the changeover switch 8 if a transition from data area to header area or vice versa or a transition between different header areas is ascertained. In the case of such a transition, the threshold value input of the signal conditioner 4 is disconnected from the output of the threshold value forming unit 5 and connected to the output of the switch unit 6.

The switch unit 6 has two switches 10, 10', which are in the switch position represented in FIG. 1 during the reading of a data area. If the signal H1 is present, the switches 10, 10' are moved into the middle switch position; if the signal H2 is present, then they are moved into the far right switch position. Consequently, the signal S1 is fed to a storage location M01, M11 or M21 of the storage unit 7 depending on the area of the recording medium that is read. In the simplest case, the storage unit 7 has the aforementioned three storage locations M01, M11 and M21.

Better results are obtained, however, if two storage locations M01, M02 and M11, M12 and M21, M22 are present for each signal path. In this case, during each system clock cycle, the content of the store Mn1 is shifted into the store Mn2, where n assumes one of the values 0, 1 or 2. This shifting is interrupted when no new input signal for the corresponding store Mn1 is present at the input of the storage unit 7. This is likewise the case if an erroneous input signal is present. It is thus ensured that the storage locations Mn2 each have correct values for the data and/or header area assigned to them. Consequently, an optimum threshold value S in each case is present at the input of the signal conditioner 4 via the switch unit 6 and, if appropriate, the changeover switch 8.

Figure 2:
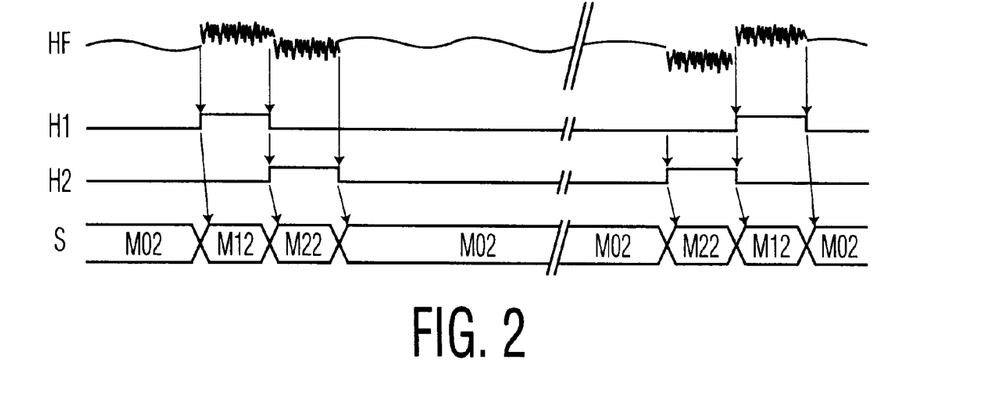
FIG. 2 shows a schematic illustration of signals occurring in an apparatus according to the invention during the reading of an optical recording medium with header area.

FIG. 2 shows a schematic illustration of signals which occur in an apparatus according to the invention during the reading of an optical recording medium with data and header areas. The upper curve schematically indicates the high-frequency signal HF. The long-wave areas in this case correspond to a data area, while the higher-frequency areas correspond to one of the header areas. The laterally offset arrangement of the header areas with respect to the track centre and the relative length of the markings have the result that a signal occurs there which is significantly noisier and has a different average value. The second curve from the top indicates the signal H1, which corresponds to the first header area. This signal is at high level as long as a first header area is being scanned, which leads to a high value in the high-frequency signal HF in the example illustrated. In all other areas the signal H1 is at low level. The curve that follows underneath indicates the signal H2, which is assigned to the second header area. It is at high level only when a second header area is being scanned. The bottom curve indicates which threshold value S is applied to the signal conditioner 4. This corresponds to the value situated in storage location M02 for the reading of the data area, and to the value situated in storage location M12 or M22 during the scanning of the first or second header area, respectively. This is indicated by the specification of the storage locations in the bottom curve.

Figure 3:
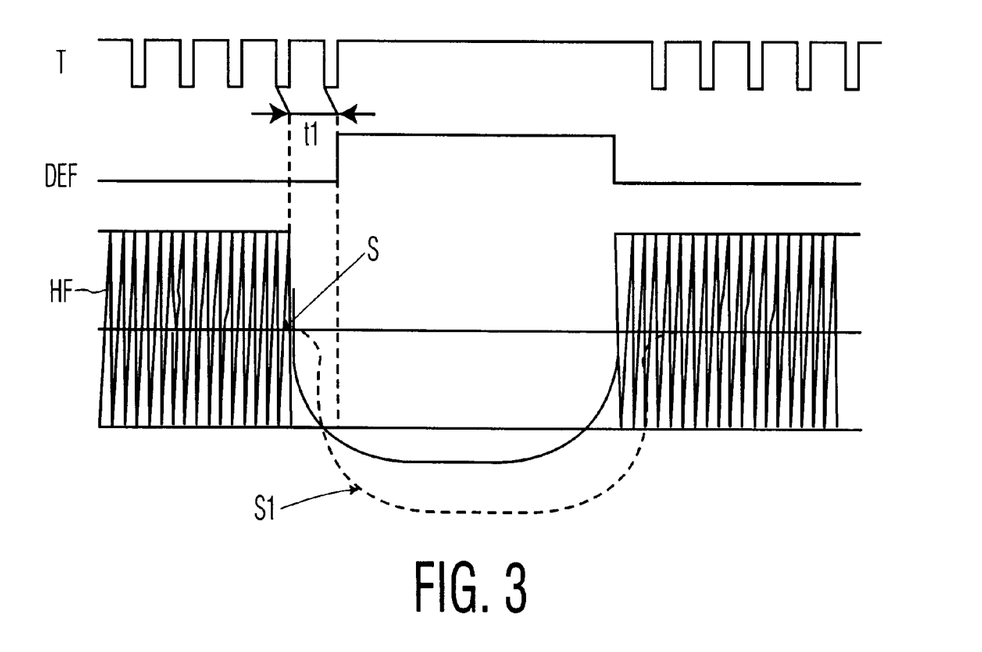
FIG. 3 shows a schematic illustration of signals occurring in an apparatus according to the invention in the event of a defect.

FIG. 3 schematically shows signals which occur in an apparatus according to the invention in the event of a defect. In this case, examples of a defect include a scratch on the recording medium or another condition under which no high-frequency signal HF occurs or only a high-frequency signal HF manifesting interference occurs. The lower part of FIG. 3 schematically illustrates the high-frequency signal HF during the reading of a data area. No defect occurs in the left-hand and right-hand areas; the high-frequency signal oscillates relatively uniformly between a lower and an upper limit value. The temporal extent of the individual oscillations is shown to have approximately the same length, in a simplified fashion, this only rarely being the case in reality. In the middle area, it is evident that the high-frequency signal HF no longer has any modulation at all and falls to a great extent. This is caused by a defect, for example by dirt on the recording medium. The top curve shows a clock signal T derived from the high-frequency signal HF and/or the conditioned signal FS. The clock signal T fails to appear if the high-frequency signal HF is interfered with in such a way that evaluation for the purpose of clock signal generation is no longer possible. In general, this becomes apparent only with a small time delay. This delay is indicated by t1. After this delay time t1, a defect signal DEF is set to high level. At this point in time, the presently formed threshold value S1, which is shown dotted in FIG. 3, has already fallen far below the average value of the high-frequency signal HF not manifesting interference. The threshold value S1 only rises slowly again even after the end of the defect. If the threshold value S1 were fed directly to the signal conditioner 4, then the conditioned signal FS formed by the signal conditioner 4 would initially be formed erroneously. According to the invention, the threshold value S read from one of the storage locations Mn2 of the storage unit 7 is applied to the signal conditioner 4. On account of the delay which it experiences in the storage unit 7, the threshold value S still has the optimum value even after the delay t1 has elapsed. As soon as the defect signal DEF jumps to high level, the content of the storage location Mn2 is no longer updated. The threshold value S is consequently maintained.

Therefore, optimum signal conditioning using the threshold value S is possible immediately after the end of the defect.

Figure 4:
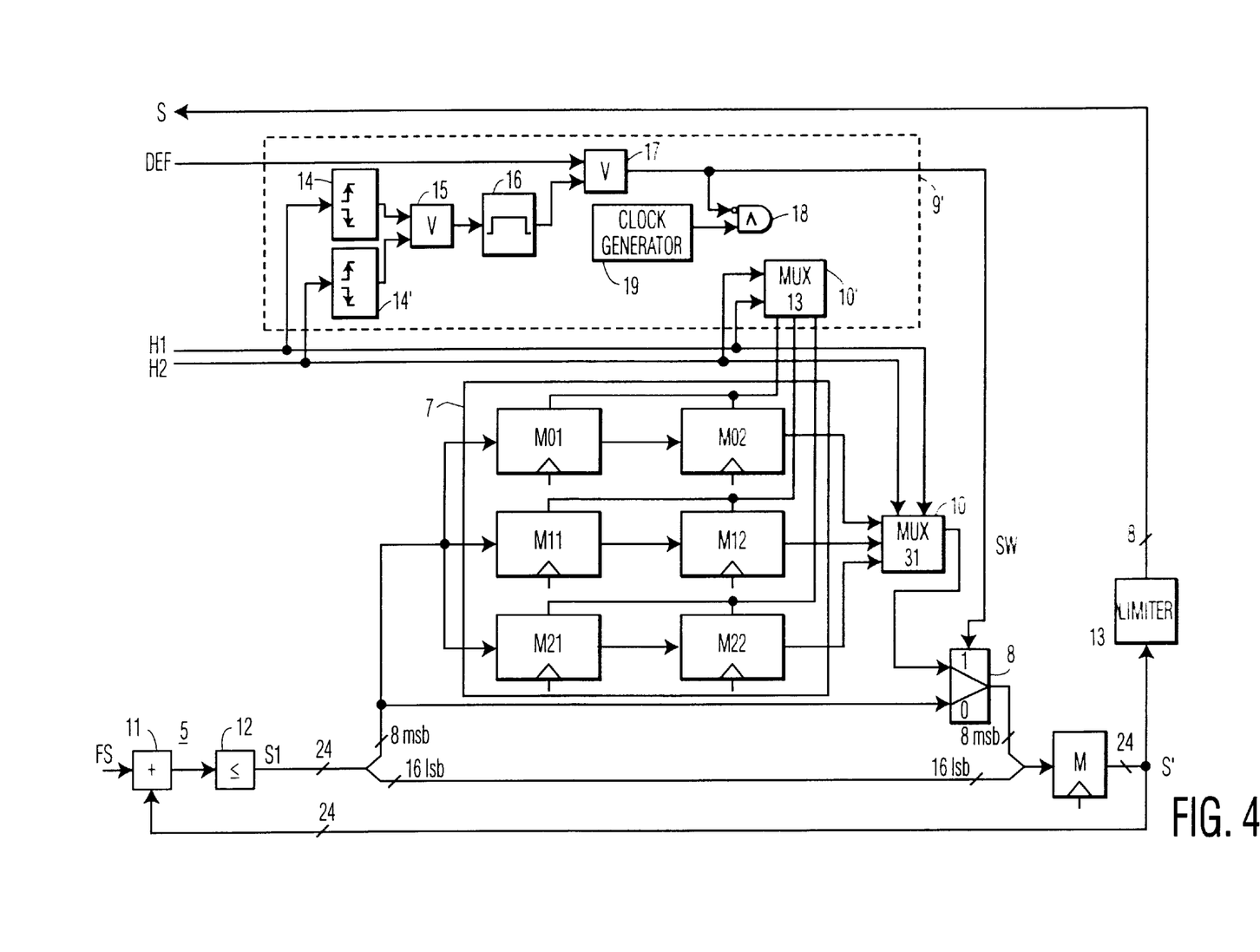
FIG. 4 shows a schematic illustration of a further embodiment of an apparatus according to the invention.

FIG. 4 shows a schematic illustration of a further embodiment of an apparatus according to the invention. In FIG. 4, data lines which have a bit width of greater than 1 are denoted by a stroke and exemplary specification of the bit width. The conditioned signal FS is fed to the threshold value forming unit 5, which has an adder 11 and a limiter 12. In the adder 11, an accumulated threshold value S' is added to the conditioned signal FS. The result of this addition is limited by the limiter 12 and output as threshold value S1. The threshold value S1, which is indicated with 24 bits here, is split into eight most significant bits, designated here by "msb", and into 16 less significant bits, designated here by "lsb". The less significant bits are fed unchanged to an output store M. The more significant bits are fed to the input of the storage unit 7, on the one hand, and to an input of the changeover switch 8, on the other hand. In the normal case, that is to say during undisturbed scanning of a data area or of a header area, the changeover switch 8 is in its lower position. The more significant bits are then likewise fed unchanged to the output store M, which outputs the accumulated threshold value S'. The latter is additionally limited in a limiter 13 and output as threshold value S.

The storage unit 7 has the storage locations M01 to M22, which are also designated by Mnn below. The clock input of the storage locations Mnn is illustrated at the bottom in each case, and the enable input is illustrated at the top in each case. Only when a high level signal is present both at the clock input and at the enable input is the content of the corresponding storage location Mnn updated by the value present at the input of the storage location, otherwise it is maintained. During the reading of a data area, only the enable inputs of the storage locations M01 and M02 are at high level; only the content of said storage locations is updated. If a transition from the data area to one of the header areas is detected, then the enable inputs of the storage locations M01 and M02 are put at low level. Even if an incorrect value is already situated in the storage location M01, the correct value for the reading of a data area is still maintained in the storage location M02. In the case of such a transition, the switch 10, which is designed as a three-to-one multiplexer, is switched in such a way that the output of the corresponding storage location M12 or M22 is connected to the input of the changeover switch 8, depending on which header area follows. The signals H1 and H2 are present at the switch 10. If both are at low level, then the output of the storage location M02 is connected to the input of the changeover switch 8. If only signal H1 is at high level, then the output of the storage location M12 is connected to the input of the changeover switch 8; if, on the other hand, only signal H2 is at high level, then the output of the storage location M22 is connected to the input of the changeover switch 8.

In this exemplary embodiment, the changeover switch 8 receives its changeover signal SW from the header identification unit 9', which, in a manner different from that described with reference to FIG. 1, utilizes the signals H1 and H2 as input signals. The signals H1 and H2 are fed to edge detectors 14, 14'. The edge detectors 14, 14' output a logic 1, that is to say high level, if their input signal has a rising and a falling edge, respectively. The outputs of the edge detectors 14, 14' are fed to an OR element 15, the output signal of which thus corresponds to a logic 1 whenever the scanning light beam passes from one area of the data track to another. The output signal of the OR element 15 is fed to a pulse generator 16, which outputs a pulse having a predeterminable length if its input signal corresponds to a logic 1. The output signal of the pulse generator 16 is fed to the changeover switch 8 via an OR element 17. In this way, the changeover switch 8 is switched not only at the instant of the transition from one area of the data track to another but also for the predetermined time following this point in time. In this case, the predeterminable time is adapted to the properties of the apparatus; by way of example, it is chosen such that it lasts longer than the transient recovery time of the signal S1, that is to say until a relatively stable signal S1 is output by the limiter 12. A defect signal DEF is present at the other input of the OR element 17, the said defect signal being output by a detection unit (not illustrated here) if a defect occurs in the high-frequency signal HF, for example on account of soiling, dirt, or a scratch on the recording medium. In the case of such a defect, too, the changeover switch 8 is switched to its upper position in order to output the threshold value S1 stored in one of the stores Mn2, the said threshold value being correct before the occurrence of the defect. The output signal of the OR element 17 is furthermore fed to an inverting input of an AND element 18, at whose other input a signal output by a clock generator 19 is present. The clock generator 19 reduces the system clock signal by a predeterminable factor, which can be adapted in a manner specific to the apparatus and, in addition, is adapted in dependence on the type of recording medium to be read. The factor may assume the value 1, but advantageous values lie in the range from 128 to 1024 or even higher. The output signal of the AND element 18 is fed as enable signal to one of the storage location pairs Mn1, Mn2 via the switch 10', which is designed as a one-to-three multiplexer. Only when this signal is present are the corresponding storage locations Mn1, Mn2 updated with the signal present at their input. Such updating is not performed if a defect is present, or during and shortly after a transition indicated by the signals H1, H2. This is achieved by the inverting input of the AND element 18. Furthermore, the updating is performed in time with the clock signal output by the clock generator 19. The input signal of the switch 10' is fed to the storage locations M0n during the scanning of a data area, that is to say when both signals H1 and H2 are at low level, to the storage locations M1n during the scanning of a first header area, that is to say when the signal H1 is at high level and the signal H2 is at low level, and to the storage locations M2n during the scanning of a second header area, that is to say when the signal H1 is at low level and when the signal H2 is at high level.

FIG. 5 shows a schematic illustration of a recording medium 1 that can be read from and/or written to by an apparatus according to the invention. Three turns of a data track 20 are illustrated, the said data track being illustrated with its width greatly exaggerated. The data track 20 is of spiral design and changes at least one of its properties after each revolution. This is emphasized in FIG. 5 by the transition area 21, identified by means of an ellipse. Those parts of the data track 20 which are shown dark are formed by depressions 22 in the information-carrying plane of the optical recording medium 1, while those areas of the data track 20 which are shown light do not have depressions and are referred to as land 23. The depressions 22 are often referred to as grooves. The data track 20 is scanned in a known manner by means of a focused light beam 3.

The transition area 21 is emphasized in a greatly enlarged manner in FIG. 6. A number of parts of the data track 20 which are formed by depressions 22 and by land 23 and essentially run parallel can be seen in the right-hand part and in the far left part of FIG. 6.

Data areas 24 with data markings 25 arranged in a centred manner are illustrated in the right-hand area and in the far left area of FIG. 6. The data markings 25 are arranged essentially centred with respect to a track centre 26 illustrated by a broken line by way of example. The markings 25, which are often also referred to as pits, for their part consist for example in depressions or elevations relative to the corresponding data track, of areas of increased or decreased reflectivity in comparison with the rest of the data track, in areas which change the direction of polarization of the light, or generally of areas which are suitable in some way for modulating the impinging light beam 3 in terms of an optical or other, for example electromagnetic, property. Situated between the areas 24 of centred markings is a header area 27 with header markings 25' arranged off-centre. The header area 27 of off-centre markings itself is again subdivided into a first header area 27' and a second header area 27" having header markings 25' which are offset differently. Thus, the header area 27 has header markings alternately offset to the right and to the left with respect to the track centre or header markings offset to the left and to the right with respect to the track centre, depending on whether the header area 27 is traversed from left to right in the track direction coming from a depression 22 or coming from a land 23.

Although only the transition area 21 is illustrated in FIG. 6, a multiplicity of header areas 27 are arranged alternately with data areas 24 per revolution of the data track 20. The extent of the header areas 27 in the track direction is in each case significantly shorter than that of the data areas 24. It is envisaged that the header areas 27 and also the off-centre header markings 25' arranged there will already be fixedly predetermined during the production of the recording medium 1, while the data markings 25 in the data area 24 will not yet be present during the production of the recording medium 1. They can then be written to the recording medium by the apparatus according to the invention. In order to ensure suitable tracking in the data areas 24 that have not yet been written to, the properties designated as land 23 and as depression 22 are likewise already fixedly predetermined during the production of the recording medium. In a special variant of the recording medium 1, provision is made for allowing the data track 20 to run in a slightly wave-like manner in the data area 24. This is also referred to as "wobbling". From the frequency of this wobble, it is possible to obtain further information that is useful or necessary for the operation of the apparatus. It is understood that the exemplary embodiment of a recording medium as specified in FIGS. 5 and 6 is mentioned only by way of example. Recording media which do not have all of the features mentioned, or which have additional features not mentioned here, can also be read from and/or written to by an apparatus according to the invention. Thus, by way of example, it is not absolutely necessary for the markings in the first header area 27' and in the second header area 27" to be at the same distance away from the track centre 26, or for them to have the same length in the track direction.

Figure 7:
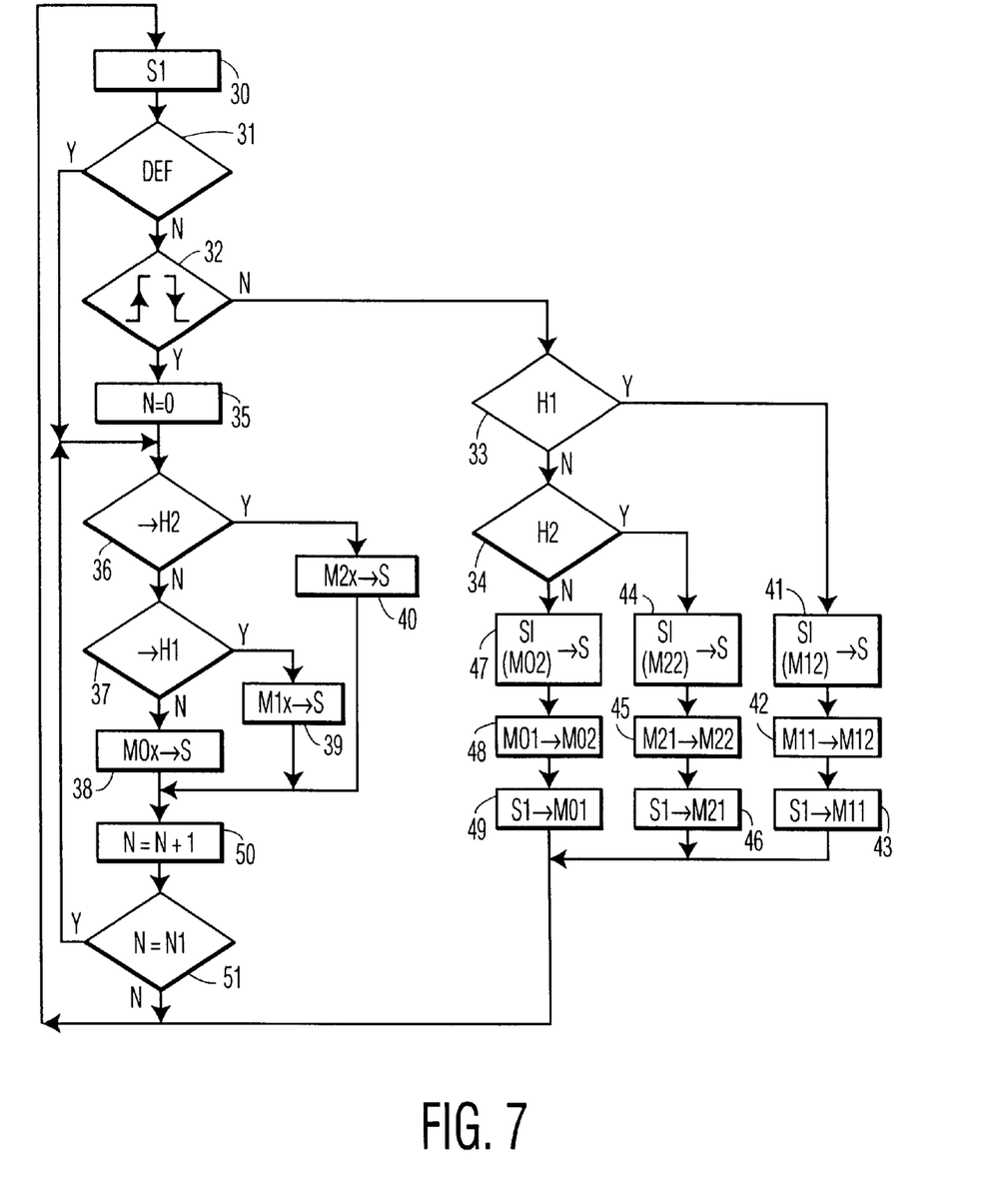
FIG. 7 shows a flow diagram of a method according to the invention.

FIG. 7 shows a flow diagram of a method according to the invention. A threshold value S1 is formed in step 30. In step 31 a check is made to see whether a defect signal DEF is present. If this is the case, then the method branches to step 36, otherwise to step 32. In step 32 a check is made to see whether an edge occurs in one of the signals H1 or H2. If this is the case, then the method branches to step 35, otherwise to step 33. In step 33 a check is made to see whether the signal H1 is at high level. If this is the case, that is to say if a first header area is being scanned, then the method branches to step 41. Otherwise the method moves to step 34, in which a check is made to see whether the signal H2 is at high level. If this is the case, that is to say if a second header area is being scanned, then the method branches to step 44, otherwise the method branches to step 47.

Steps 41 to 43 relate to the storage locations M1n, steps 44 to 46 to the storage locations M2n and steps 47 to 49 to the storage locations M0n. In steps 41, 44 and 47, the threshold value S1 is output as threshold value S to be utilized by the signal conditioner 4 in accordance with FIG. 1. In an alternative refinement of the invention, the value contained in the respective second storage location M2n is output as threshold value S in these steps, instead of the threshold value S1. In steps 42, 45 and 48, the content of the respective first storage location Mn1 is accepted into the respective second storage location Mn2. In steps 43, 46, 49, the present threshold value S1 is accepted into the respective first storage location Mn1. The method subsequently returns to step 30. In an alternative version of the exemplary embodiment, only a first storage location Mn1 is present in each case. Steps 42, 45 and 48 are omitted in this case.

In step 35 a count N is set to zero. In step 36 a check is made to see whether the next area following the edge or the defect signal will be a second header area. If this is the case, then the method branches to step 40. If this is not the case, then in step 37 a check is made to see whether the next area to be scanned will be a first header area. If this is the case, then the method branches to step 39; if this is not the case, then the method branches to step 38.

In step 38 the content of the storage location M02 or, if no storage location M02 is present, the content of the storage location M01 is output as threshold value S. Step 50 is subsequently executed. In steps 39 and 40 the content of the storage location M1x and M2x, respectively, is output as threshold value S, in which case, given the presence of the storage locations M12 and M22, respectively, it holds true that x=2, otherwise x=1. After step 39 or 40, the method branches to step 50. The count N is incremented by 1 in step 50. In step 51 a check is made to see whether the count N is less than a prescribed value N1. If this is the case, then the method branches to step 36, otherwise to step 30. The length of time for which the stored value is output as threshold value S after the occurrence of an edge or of a defect is established by way of the prescribed value N1.

There are number of possibilities for determining or predicting the next area to be read in steps 36, 37. After the detection of an edge in step 32, it may be assumed that the next area to be scanned can be unambiguously identified as first header area, second header area or data area using the signals H1 and H2. In the event of a defect, it may be that a reliable signal H1 or H2 is not present. In this case, by way of example, it may be assumed that the area to be read after the defect corresponds to the last area to be read prior to the defect. In the event of a defect that persists for a long time, it is possible, for example on the basis of the known structure of the recording medium, to conclude from the temporal length of the defect which area is presumably to be read after the end of the defect. A large number of further possibilities are possible here within the scope of the present invention.

In general, it is necessary to determine an average DC voltage offset of a data signal originating from an optical recording medium, in order to convert the analogue signal HF into a digital bit stream FS using this threshold value S. This threshold value S, also called slice level, serves as a threshold value in a comparator. Examples of optical recording media which have both data markings and different header markings in each case with different signal amplitudes and offsets are rewritable disks, for example a so-called DVD-RAM. A system which operates with a single threshold value has problems during the reading of such recording media: a very short time constant would have to be used. According to the invention, the preceding threshold value is stored and, in the event of a transition, the corresponding stored value of the threshold value used. The transient recovery time is thus reduced without a short time constant being necessary. Storing a plurality of threshold values exactly is particularly simple if a digital route is taken. The exemplary embodiment implements a threshold value circuit and a defect protection device which has two storage locations Mn1, Mn2 per area. These storage locations are updated only when the corresponding signal is present. In the event of a defect, the preceding stored threshold value is utilized and the storage locations are not updated until the defect is over. This defect protection is present for the threshold values of all three areas. If a transition from one area to another is detected, a short pulse is generated which has the same effect as a defect signal and results in the threshold value of the correspondingly new area being used. It also lies within the scope of the invention, of course, additionally to provide an alteration of the time constant for a short time after the beginning of a transition, in order additionally to keep the transient recovery time short. Advantages of the invention are that the changeover of the threshold values makes it possible to have a correct digital bit stream available virtually immediately, a stable time constant of the signal conditioner 4 being maintained at the same time. The combination of the defect suppression and of the changeover optimizes the number of required storage locations and enables protection in the event of a defect. The changeover between short and long time constant is advantageously additionally utilized to improve the properties of the apparatus. It is envisaged that as many parameters as possible will be designed in a prescribable manner, with the result that the apparatus according to the invention and the corresponding method are compatible for virtually any type of recording media, for example with respect to any CD or DVD format.

What is claimed is:

1. Apparatus for reading or writing data markings (25) of an optical recording medium (1) having data markings (25) arranged along a track (20) and header markings (25') arranged laterally offset with respect to the centre of this track (20), the apparatus comprising a signal conditioner (4), for generating a conditioned signal out of a signal read from the recording medium a header identification unit (9) for identifying a header area a switch unit (6) driven by said header identification unit, a threshold value forming unit (5) and a storage unit (7) with at least two storage locations (M01, M02, M11, M12, M21, M22), wherein, by means of the switch unit (6), the input of the storage unit (7) can be connected to the output of the threshold value forming unit (5) and the output of the said storage unit can be connected to a threshold value input of the signal conditioner (4).

2. Apparatus according to claim 1, characterized in that the switch unit (6) has three switch positions.

3. Apparatus according to claim 1, characterized in that the threshold value forming unit (5) and the storage unit (7) are realized on a digital basis.

4. Apparatus according to claim 1, characterized in that in each case two storage locations (Mn1, Mn2) are provided for each switch position (n=0, 1, 2).

5. Apparatus according to claim 3, characterized in that in each case two storage locations (Mn1, Mn2) are provided for each switch position (n=0, 1, 2).

6. Apparatus according to claim 4, characterized in that a switch (8) is present for connecting the threshold value input of the signal conditioner (4) to the output of the switch unit (6) or to the output of the threshold value forming unit (5).

7. Apparatus according to claim 5, characterized in that a switch (8) is present for connecting the threshold value input of the signal conditioner (4) to the output of the switch unit (6) or to the output of the threshold value forming unit (5).

8. Method for the error-free read-out of data markings (25) and header markings (25') of an optical recording medium (1) having data markings (25) arranged along a track (20) and header markings (25') arranged laterally offset with respect to the centre of this track (20), the method comprising the steps forming a threshold value (S)

forming a conditioned signal (FS) from a detector signal (HF) by means of said threshold value (S), storing a present threshold value (S1) in a first store (M01) during the reading of a data area (24)

storing the present threshold value (S1) in a second store (M11, M21) during the reading of a header area (27, 27', 27"), and preventing said storing and instead using the stored threshold value (S1) corresponding to the area (24, 27, 27', 27") to be newly read for the purpose of forming the conditioned signal (FS), given the presence of a transition from one area of the areas (24, 27, 27', 27") to another area of the areas (24, 27, 27', 27").

9. Method according to claim 8, characterized in that the prevention of new storage and the use of the value already stored are maintained for a predetermined period of time after the identification of a transition.

10. Method according to claim 8, characterized in that the prevention of new storage and the use of the value already stored are also effected when a defect occurs.

11. Method according to claim 8, characterized in that in the event of a plurality of different types of header areas (27, 27', 27") or data areas (24) being present, further stores are provided in which storage is correspondingly effected and from which reading is correspondingly effected.

12. Method according to claim 8, characterized in that each store has at least two storage locations (Mn1, Mn2), in which case storage is effected in a first storage location (Mn1), reading is effected from a second storage location (Mn2), in a manner staggered over time the content of the first storage location (Mn1) is transferred to the second storage location (Mn2) and, in order to interrupt the storage, the transfer from the first storage location (Mn1) to the second storage location (Mn2) is prevented.

13. Method according to claim 11, characterized in that each store has at least two storage locations (Mn1, Mn2), in which case storage is effected in a first storage location (Mn1), reading is effected from a second storage location (Mn2), in a manner staggered over time the content of the first storage location (Mn1) is transferred to the second storage location (Mn2) and, in order to interrupt the storage, the transfer from the first storage location (Mn1) to the second storage location (Mn2) is prevented.

* * * * *